(12) United States Patent
Takahashi et al.

(10) Patent No.: US 8,445,852 B2
(45) Date of Patent: May 21, 2013

(54) SIGNAL LIGHT DETECTION DEVICE AND METHOD OF DETECTING SIGNAL LIGHT

(75) Inventors: Hiroyuki Takahashi, Tokyo (JP); Yoshiyuki Usuki, Ibaraki (JP); Kei Kamada, Ibaraki (JP)

(73) Assignees: The University of Tokyo, Tokyo (JP); Furukawa Co., Ltd, Tokyo (JP)

( * ) Notice: Subject to any disclaimer, the term of this patent is extended or adjusted under 35 U.S.C. 154(b) by 352 days.

(21) Appl. No.: 12/996,714

(22) PCT Filed: Jun. 11, 2010

(86) PCT No.: PCT/JP2010/003907
§ 371 (c)(1),
(2), (4) Date: Dec. 7, 2010

(87) PCT Pub. No.: WO2010/146817
PCT Pub. Date: Dec. 23, 2010

(65) Prior Publication Data
US 2011/0215249 A1 Sep. 8, 2011

(30) Foreign Application Priority Data
Jun. 15, 2009 (JP) .................................. 2009-142463

(51) Int. Cl.
*G01T 1/20* (2006.01)
(52) U.S. Cl.
USPC ..................................... 250/369; 250/370.09
(58) Field of Classification Search
USPC ............ 250/369, 370.01–15, 559.01–559.09, 250/559.1–559.4, 559.11–559.19, 559.21–559.29, 559.31–559.39, 559.41–559.49
See application file for complete search history.

(56) References Cited

U.S. PATENT DOCUMENTS 4,217,497 A * 8/1980 Daniels et al. ................ 250/369
4,482,808 A * 11/1984 Tominaga et al. ............ 250/392
(Continued)

FOREIGN PATENT DOCUMENTS

JP 11-231058 8/1999
JP 2003-004853 1/2003
(Continued)

OTHER PUBLICATIONS

Sang Yeol Kim et al., "Pulse-shape compensation of time walk using a multi-threshold technique", 1998, vol. 414, pp. 372-385.
(Continued)

*Primary Examiner* — David Porta
*Assistant Examiner* — Taeho Jo
(74) *Attorney, Agent, or Firm* — Rankin, Hill & Clark LLP

(57) ABSTRACT

An electric signal produced by a photo-electric conversion element (104) is input to a comparator (120). The comparator (120) judges whether the electric signal output from the amplifier (110) exceeds a reference voltage or not, and outputs a HIGH signal if "exceeds". A reference voltage modifier unit (130) elevates the reference voltage, after a predetermined time period elapses since the comparator (120) judged that the electric signal reached or exceeded the reference voltage. The signal processor calculates an incidence time which represents a time when the signal light starts to enter the photo-electric converter unit (100), by correcting a rise-up time of the electric signal when it reaches or exceeds the reference voltage, based on a pulse width which represents a time period from when the electric signal exceeds the reference voltage, up to when the electric signal falls below the reference voltage.

6 Claims, 4 Drawing Sheets

U.S. PATENT DOCUMENTS

| | | | |
|---|---|---|---|
| 5,004,904 A * | 4/1991 | Yamakawa et al. | 250/207 |
| 5,349,193 A * | 9/1994 | Mott et al. | 250/370.06 |
| 6,153,882 A * | 11/2000 | Nygard | 250/370.09 |
| 6,160,259 A * | 12/2000 | Petrillo et al. | 250/363.07 |
| 6,333,503 B1 * | 12/2001 | Chapuis et al. | 250/369 |
| 6,590,215 B2 * | 7/2003 | Nygard et al. | 250/370.09 |
| 7,108,424 B2 * | 9/2006 | Heumann et al. | 378/207 |
| 7,818,047 B2 * | 10/2010 | Tumer et al. | 600/436 |
| 8,115,179 B2 * | 2/2012 | Riedel et al. | 250/392 |
| 2002/0145115 A1 | 10/2002 | Nygard et al. | |
| 2010/0078569 A1 | 4/2010 | Jarron et al. | |

FOREIGN PATENT DOCUMENTS

| | | |
|---|---|---|
| JP | 2007-187546 | 7/2007 |
| WO | 2008/040384 | 4/2008 |

OTHER PUBLICATIONS

Xuzong Liu et al., "A time-over-threshold technique for PMT signals processing", 2007, vol. 18, pp. 164-171.

Glenn F. Knoll, "Radiation Detection and Measurement", pp. 681-686.

International Search Report Dated Jun. 29, 2010.

* cited by examiner

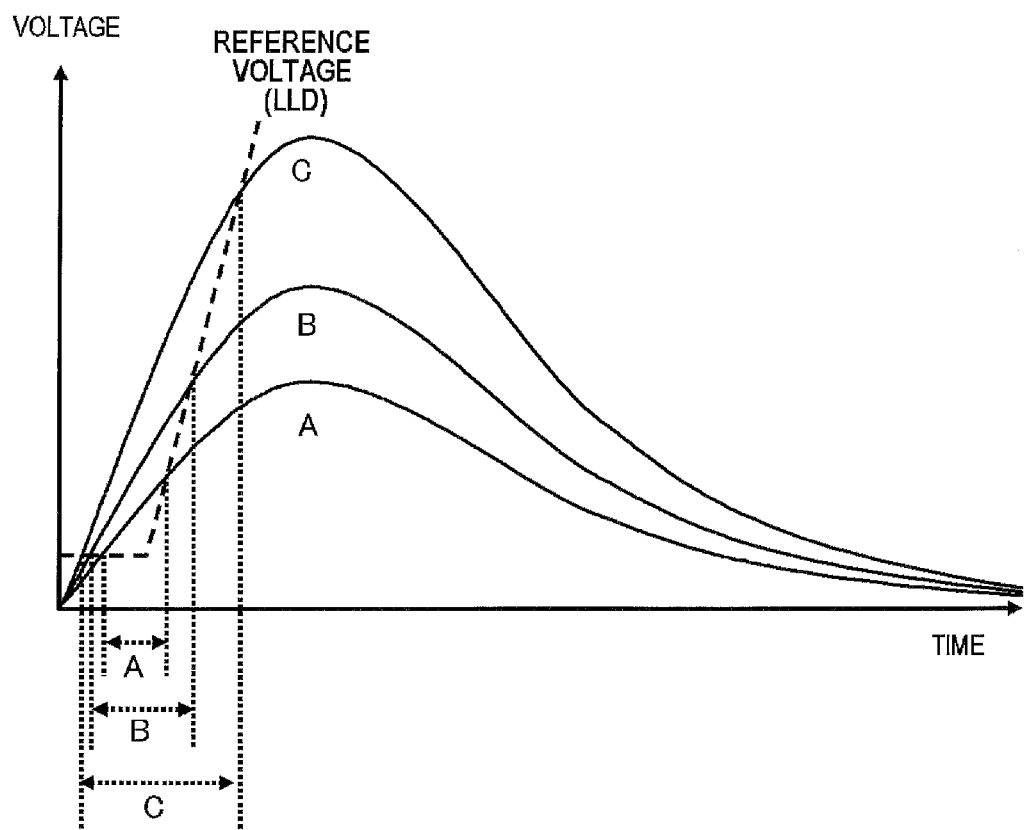

SIGNAL LIGHT DETECTION DEVICE AND METHOD OF DETECTING SIGNAL LIGHT

TECHNICAL FIELD

The present invention relates to a signal light detection device and a method of detecting signal light, capable of precisely detecting incidence start time of signal light.

BACKGROUND ART

Positron emission tomography (PET) has been known as one method of detecting cancer by taking cross-sectional images of human body. PET is a device for determining position of cancer cells, by detecting radiation emitted from positron-emissive nuclear species incorporated into the cancer cells. In PET, radiation is converted by a scintillator into short-wavelength light. The light after the conversion is further converted by a photo-electric conversion element into an electric signal, so that the radiation is detected by analyzing the electric signal.

In position determination of cancer cells, it is important to improve accuracy of detection timing of radiation. One of erroneous factors in the detection timing of radiation may be ascribable to variation in slope of the electric signal depending on pulse height, and this may result in an error of incidence start time of radiation. One technique of clearing the causal factor is known as constant fraction timing. As is known from description typically in Non-Patent Document 1, the technique is designed to detect the incidence start time of radiation, based on time corresponded to zero-cross point of a signal produced by summing an attenuated signal of an input signal and an inverted signal of the input signal. Non-Patent Document 1 also describes other techniques analogous to the constant fraction timing.

CITATION LIST

Non-Patent Document

[Non-Patent Document 1]
"Hoshasen Keisoku Handbook (The Handbook of Radiation Measurement)", written by G. F. Knoll, translated by Itsuro Kimura and Eiji Sakai, published by Nikkann Kogyo Shimbun, Ltd., 2001.

SUMMARY OF THE INVENTION

Problem to be Solved by the Invention

The constant fraction timing and the analogous techniques need inversion of the input signal. The inversion of the input signal needs a complicated analog circuit. On the other hand, there has been an accelerated trend of integrating necessary circuits on a single semiconductor chip. Integration of the complicated analog circuit pushes up cost of the semiconductor chip.

The present invention was conceived after considering the above-described situation, and an object of which is to provide a signal light detection device and a method of detecting signal light, capable of suppressing an error of incidence start time of radiation, due to slope of electric signal at the rise-up point thereof, from occurring, without needing a complicated analog circuit.

Means for Solving Problem

According to the present invention, there is provided a signal light detection device which includes:

an AD converter circuit which converts an electric signal, output from a photo-electric converter unit which converts signal light into an analog electric signal, into a digital signal; and a correction unit which corrects the digital signal,
the AD converter circuit includes;
a comparator which judges whether the electric signal reaches or exceeds a reference voltage, or not; and
a reference voltage modifier unit which elevates the reference voltage, after a predetermined time period elapses since the comparator judged that the electric signal reached or exceeded the reference voltage, and the correction unit calculates an incidence time which represents a time when the signal light starts to enter the photo-electric converter unit, by correcting a rise-up time of the electric signal when it reaches or exceeds the reference voltage, based on a pulse width which represents a time period from when the electric signal exceeds the reference voltage, up to when the electric signal falls below the reference voltage.

According to the present invention, there is also provided a method of detecting signal light which includes:

allowing a photo-electric converter unit to convert a signal light into an analog electric signal;

allowing the comparator to judge whether the electric signal reaches or exceeds reference voltage, or not;

allowing a reference voltage modifier unit to elevate the reference voltage, after a predetermined time period elapses since the comparator judged that the electric signal reached or exceeded the reference voltage; and allowing the correction unit to calculate an incidence time which represents a time when the signal light starts to enter the photo-electric converter unit, by correcting a rise-up time of the electric signal when it reaches or exceeds the reference voltage, based on a pulse width which represents a time period from when the electric signal exceeds the reference voltage, up to when the electric signal falls below the reference voltage.

Advantage of the Invention

According to the present invention, error of incidence start time of radiation, due to slope of electric signal at the rise-up point thereof, may be suppressed from occurring, without needing a complicated analog circuit.

BRIEF DESCRIPTION OF THE DRAWINGS

The above and other objects, features and advantages of the present invention will be more apparent from the following description of a certain preferred embodiment taken in conjunction with the accompanying drawings.

FIG. 4 is a chart specifically explaining correction given by a correction unit, referring to time-dependent changes in output voltage of an amplifier upon incidence of radiation into a scintillator.

BEST MODE FOR CARRYING OUT THE INVENTION

Figure 1:
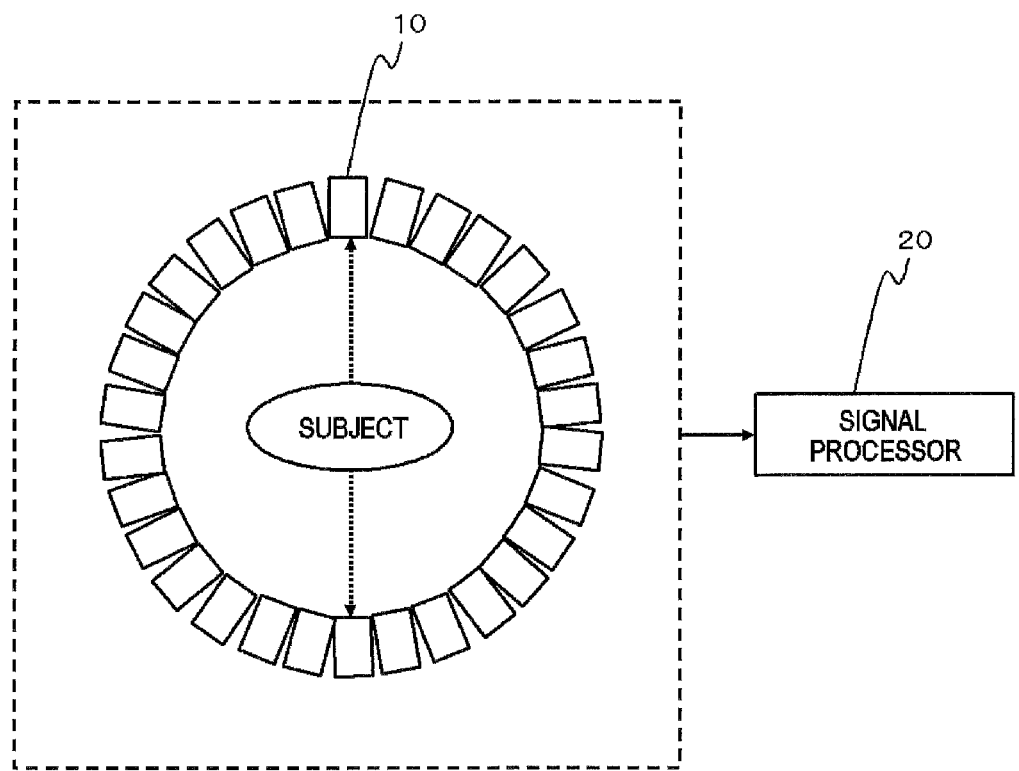
FIG. 1 is a drawing illustrating a configuration of a positron emission tomography apparatus.

Embodiments of the present invention will now be explained, referring to the attached drawings. Note that all similar constituents are given the same reference numerals or symbols in all drawing, so as to appropriately avoid repetitive explanations.

FIG. 1 is a drawing illustrating a configuration of a positron emission tomography apparatus according to an embodiment. The positron emission tomography apparatus has a plurality of signal light detection devices 10 and a signal processor 20. The plurality of signal light detection devices 10 are arranged so as to surround a subject. Signals detected by the signal light detection devices 10 are sent to the signal processor 20. The signal processor 20 processes the signals received from the signal light detection devices 10, and calculates in which part of body of the subject do the cancer cells reside.

More specifically, when emitted positron species incorporated in the cancer cells of the subject decay, radiation of 0.511 KeV is produced. The radiation is detected almost at the same time by two opposing signal light detection devices 10. The signal processor 20 judges by which signal light detection devices 10 was the radiation detected, then compiles the results of judgment to produce an image, to thereby calculate in which part of body of the subject do the cancer cells reside. Accordingly, it is important for the positron emission tomography apparatus to raise accuracy of detection timing of radiation.

Figure 2:
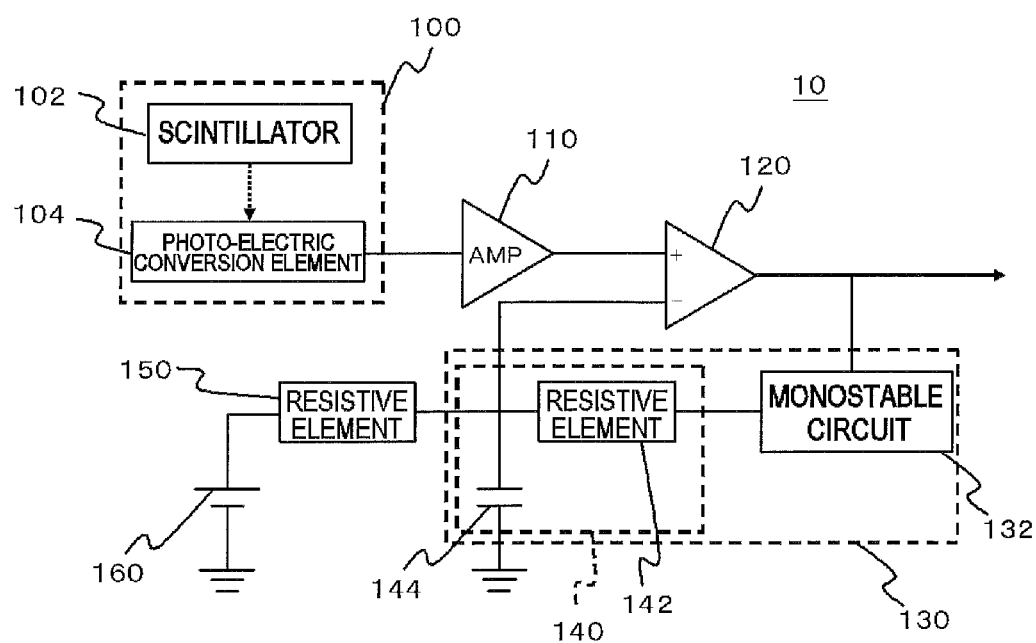
FIG. 2 is a block diagram illustrating a functional configuration of a signal light detection device.

FIG. 2 is a block diagram illustrating a functional configuration of the signal light detection device 10. Each signal light detection device 10 has a photo-electric converter unit 100 and an AD converter circuit. The AD converter circuit has a comparator 120 and a reference voltage modifier unit 130.

The photo-electric converter unit 100 has a scintillator 102 and a photo-electric conversion element 104. The scintillator 102 emits phosphorescence upon incidence of radiation. The photo-electric conversion element 104 is typically a photo-diode, and converts the phosphorescence emitted by the scintillator 102 into an analog electric signal. In this embodiment, the electric signal generated by the photo-electric conversion element 104 is amplified by an amplifier 110, and input to the comparator 120 of the AD converter circuit.

The comparator 120 judges whether the electric signal output from the amplifier 110 reaches or exceeds a reference voltage (LDD) or not, and if "exceeds", then outputs a HIGH signal. The duration, over which the comparator 120 outputs the HIGH signal, may be judged that the radiation is incident on the scintillator 102.

The reference voltage modifier unit 130 elevates the reference voltage, after a predetermined time period elapses since the comparator 120 judged that the electric signal reached or exceeded the reference voltage. In this embodiment, the reference voltage modifier unit 130 has a monostable circuit 132 and an RC circuit 140. The monostable circuit 132 has an input section thereof connected to an output section of the comparator 120. The RC circuit 140 has a resistive element 142 and a capacitance element 144, and connects an output section of the monostable circuit 132 to a reference voltage input section of the comparator 120. To the reference voltage input section of the comparator 120, a DC power source 160 is connected while placing a resistive element 150 in between.

Amount of elevation of the reference voltage by the reference voltage modifier unit 130 may typically be given by a linear function with time variable, or may be a quadric or higher-degree function, without limitation.

Output of the comparator 120 is given to the signal processor 20. As detailed later, the signal processor 20 calculates an incidence time which represents a time when the signal light starts to enter the photo-electric converter unit, by correcting a rise-up time of the electric signal when it reaches or exceeds the reference voltage, based on a pulse width which represents a time period ranging from a rise-up time of the electric signal up to or above the reference voltage, to a fall-down time of the electric signal down to or below the reference voltage.

The signal light detection device 10 described in the above may be configured as a single semiconductor chip, excluding the scintillator 102 and the DC power source 160. The semiconductor chip has the amplifier 110, the comparator 120, the monostable circuit 132, the resistive elements 142, 150, and a capacitive element 144, but needs no complicated analog circuit.

Figure 3:
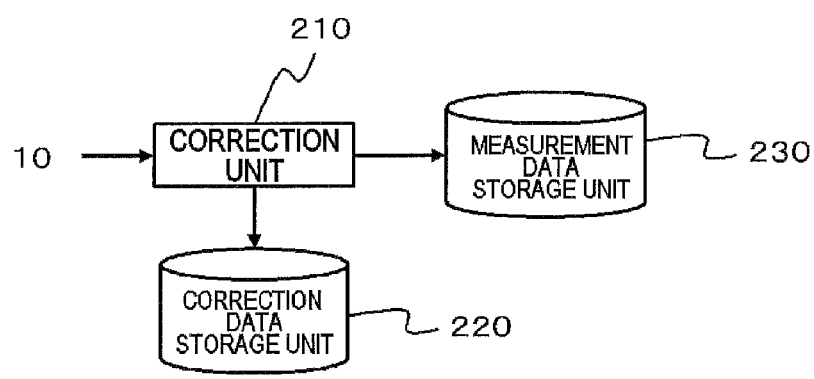
FIG. 3 is a block diagram illustrating a functional configuration of a signal processor.

FIG. 3 is a block diagram illustrating a functional configuration of the signal processor 20. The signal processor 20 has a correction unit 210, a correction data storage unit 220, and a measurement data storage unit 230.

The correction unit 210 recognizes the HIGH signal, output from the comparator 120 of the signal light detection device 10, as a pulse signal which represents a time period over which the radiation is incident on the scintillator 102.

The correction data storage unit 220 stores data for correcting the rise-up time of the pulse signal. The data represent relations between width of the pulse signal which represents the time period over which the radiation is incident on the scintillator 102, and amount of correction of the rise-up time, and are given in a form of correction table or correction function.

The correction unit 210 recognizes the width of the pulse signal, and reads or calculates the amount of correction corresponded to the width, using the data stored in the correction data storage unit 220. The correction unit 210 then corrects the rise-up-time of the pulse signal, using the amount of correction read or calculated as described in the above.

FIG. 4 is a drawing for specifically explaining the correction carried out by the correction unit 210, and illustrates time-dependent changes in output voltage of the amplifier 110 upon incidence of the radiation into the scintillator 102. The origin (zero point) on the abscissa (time axis) stands for the time when the radiation enters the scintillator 102. Curve A represents a weak radiation, curve C represents a strong radiation, and curve B represents an intermediate radiation.

The reference voltage of the comparator 120 is kept constant before an output of the amplifier 110 arises. Upon incidence of the radiation on the scintillator 102, the output arises at a slope which is variable depending on intensity of the incident radiation. Accordingly, the rise-up time of the pulse signal output from the comparator 120 varies among the curves A, B and C. More specifically, the rise-up time is earliest in the curve C, followed by the curve B and the curve A, in this order.

The reference voltage modifier unit 130 elevates the reference voltage of the comparator 120, after a predetermined time period elapses. The reference voltage of the comparator 120 exceeds the output voltage of the amplifier 110 at a certain time. At this moment, the pulse signal output by the comparator 120 falls down. The fall-down time is variable among the curves A, B and C. More specifically, the fall-down time is earliest in the curve A, followed by the curve B and the curve C, in this order.

Accordingly, the width of the pulse signal output by the comparator 120 varies among the curves A, B and C. More specifically, the width is narrowest in the curve A, followed by the curve B and the curve C, in this order.

As may be understood from the above, the width of the pulse signal output by the comparator 120 correlates with a time period from when the radiation enters the scintillator 102 up to when the pulse signal rises up. More specifically, the narrower the width of the pulse signal will be, the longer a time period from when the radiation enters the scintillator 102 up to when the pulse signal rises up will be. Accordingly, by making the correction data storage unit 220 store data representing the correlation, it is now possible to precisely correct the time when the pulse signal output from the comparator 120 rises up.

While FIG. 4 illustrates an exemplary case where the rate of elevation of the reference voltage of the comparator 120 is relatively high, enough to make the pulse signal fall down before the output voltage of the amplifier 110 reaches the peak, the rate of elevation of the reference voltage of the comparator may alternatively be made slower, so as to allow the pulse signal to fall down after the output voltage of the amplifier 110 reaches the peak.

As has been described in the above, in this embodiment, the reference voltage is elevated after a predetermined time period elapses since the output of the amplifier 110 exceeded the reference voltage of the comparator 120. A correlation therefore appears between the width of the pulse signal output from the comparator 120, and a time period from when the radiation enters the scintillator 102 up to when the pulse signal rises up. Accordingly, by making the correction data storage unit 220 store data representing the correlation, it is now possible to precisely correct the time when the pulse signal output from the comparator 120 rises up.

In addition, none of the amplifier 110, the comparator 120, the monostable circuit 132, the resistive elements 142, 150, and the capacitive element 144 of the signal light detection device 10 need complicated analog circuit. As a consequence, cost of manufacturing may be reduced if these components were integrated into a single semiconductor chip.

The embodiments of the present invention have been described referring to the attached drawings only for exemplary purposes, while allowing adoption of any other various configurations. For example, the signal light detection device 10, described in the embodiment in the above as a device of detecting radiation, aimed at adoption to PET, is not limited thereto. Moreover, light to be detected by the signal light detection device 10 is not limited to radiation, and may be light of other wavelengths. In this case, the scintillator 102 is no longer necessary.

The invention claimed is:

1. A signal light detection device comprising:
   an AD converter circuit which converts an electric signal, output from a photo-electric converter unit which converts signal light into an analog electric signal, into a digital signal; and
   a correction unit which corrects said digital signal,
   said AD converter circuit comprising;
      a comparator which judges whether said electric signal reaches or exceeds a reference voltage, or not; and
      a reference voltage modifier unit which elevates said reference voltage, after a predetermined time period elapses since said comparator judged that said electric signal reached or exceeded said reference voltage, and
   said correction unit calculates an incidence time which represents a time when said signal light starts to enter said photo-electric converter unit, by correcting a rise-up time of said electric signal when it exceeds said reference voltage, based on a pulse width which represents a time period from when said electric signal reaches or exceeds said reference voltage, up to when said electric signal falls below said reference voltage.

2. The signal light detection device as claimed in claim 1, further comprising:
   a correction data storage unit which stores a table or a function correlating said pulse width with the amount of correction of the rise-up time, and
   said correction unit corrects the rise-up time based on said table or said function.

3. The signal light detection device as claimed in claim 1, wherein said reference voltage modifier unit comprises:
   a monostable circuit which has an input section thereof connected to an output section of said comparator; and
   an RC circuit which connects an output section of said monostable circuit to a reference voltage input section of said comparator.

4. The signal light detection device as claimed in claim 1, wherein said signal light is radiation, and said photo-electric converter unit has a scintillator.

5. The signal light detection device as claimed in claim 1, further comprising said photo-electric converter unit.

6. A method of detecting signal light comprising:
   allowing a photo-electric converter unit to convert a signal light into an analog electric signal;
   allowing said comparator to judge whether said electric signal reaches or exceeds reference voltage, or not;
   allowing a reference voltage modifier unit to elevate said reference voltage, after a predetermined time period elapses since said comparator judged that said electric signal reached or exceeded said reference voltage; and
   allowing said correction unit to calculate an incidence time which represents a time when said signal light starts to enter said photo-electric converter unit, by correcting a rise-up time of said electric signal when it reaches or exceeds said reference voltage, based on a pulse width which represents a time period from when said electric signal exceeds said reference voltage, up to when said electric signal falls below said reference voltage.

* * * * *